United States Patent [19]
Suzuki

[11] Patent Number: 5,765,441
[45] Date of Patent: Jun. 16, 1998

[54] MECHANISM FOR TRANSLATING BETWEEN RECIPROCATING AND ROTATIONAL MOVEMENT

[76] Inventor: Tadakazu Suzuki, No. 1-1-13, Minami Kugahara, Ota-ku, Tokyo, Japan, 146

[21] Appl. No.: 689,650

[22] Filed: Aug. 12, 1996

[30] Foreign Application Priority Data

Aug. 14, 1995 [JP] Japan ............................ 7-237511

[51] Int. Cl.$^6$ .............................. F16H 29/02; F16H 31/00
[52] U.S. Cl. .............................................. 74/136; 280/252
[58] Field of Search ........................ 74/136, 137; 280/252

[56] References Cited

U.S. PATENT DOCUMENTS

| | | | |
|---|---|---|---|
| 3,020,773 | 2/1962 | Golding | 74/136 X |
| 3,891,235 | 6/1975 | Shelly | 280/252 |
| 4,169,609 | 10/1979 | Zampedro | 280/252 X |
| 5,236,211 | 8/1993 | Meguerditchian | 280/252 X |

FOREIGN PATENT DOCUMENTS

| | | | |
|---|---|---|---|
| 61-205893 | 6/1985 | Japan. | |
| 62-135693 | 2/1986 | Japan. | |
| 64-58852 | 3/1989 | Japan. | |
| 64-58853 | 3/1989 | Japan. | |
| 665692 | 5/1988 | Switzerland | 280/252 |

*Primary Examiner*—Allan D. Herrmann
*Attorney, Agent, or Firm*—Darby & Darby

[57] ABSTRACT

A motion translation machine for converting reciprocating movement to rotational movement includes a frame that has drive pulleys, a drive belt connected to the drive pulleys, at least two perimeter pulleys and a perimeter belt which is supported by the drive pulleys and the perimeter pulleys. At least one drive pulley and both perimeter pulleys are restricted to a single direction of rotation. A reciprocating spindle is attached to the frame and includes a contact pulley which engages with a portion of the perimeter belt. Movement of the spindle causes a displacement of the belt, which, in turn, moves about the frame and drive and perimeter pulleys. Rotational restriction of the pulleys causes the perimeter belt to rotate in a single direction. Each cycle of reciprocation causes both drive pulleys to rotate in the same direction. The reciprocating spindle may be driven by human power or pressurized fluid, including internal combustion engines, and pneumatic and hydraulic cylinders.

1 Claim, 8 Drawing Sheets

MECHANISM FOR TRANSLATING BETWEEN RECIPROCATING AND ROTATIONAL MOVEMENT

BACKGROUND OF THE INVENTION

1. Field of the Invention

This invention generally relates to mechanisms for translating motion, and more particularly, to such mechanisms for translating between reciprocating and rotating motions.

2. Discussion of the Related Art

Most machines include some conversion or translation of movement. For example, the crank located within an internal combustion engine translates the reciprocating motion of the pistons to a rotational movement that can be used to rotate the wheels of an automobile. The crank mechanism used to convert between reciprocation and rotation has also been applied to simple machines, such as bicycles wherein the up and down leg movements of a human rider is translated to a rotational motion which is used to rotate a wheel and propel the bicycle forward.

Conventional cranks include a central shaft portion and an offset connecting portion. A reciprocating linkage is attached to the connecting portion and is therefore forced to follow the orbital path of the connecting portion as the crank rotates about a central axis. This motion causes a crank end of the linkage to displace transversely (vibrate or swing back and forth depending on the size of the crank and the length of the linkage), while a reciprocating end (located remote from the crank) of the linkage remains relatively stationary, pivoting slightly at a connecting point (a gudgeon pin, for example) to accommodate for the transverse displacement of the linkage at the crank end. The transverse displacement of the linkages connected to a crank creates undue stress and wear on the linkage and drive components of the machine. The piston of an internal combustion engine, for example, is forced to swing within its cylinder about a gudgeon pin, pivoted by the transverse displacement caused by the crank and includes a skirt portion to help counteract the movement. Although the skirt portion of the piston is effective, it invariably wears and the piston, piston rings, and cylinder are eventually damaged by the swinging action caused by the transverse displacement of the linkage.

SUMMARY OF THE INVENTION

A motion translation machine for converting reciprocating movement to rotational movement includes a frame that has drive pulleys, a drive belt connected to the drive pulleys, at least two perimeter pulleys and a perimeter belt which is supported by the drive pulleys and the perimeter pulleys. At least one drive pulley and both perimeter pulleys are restricted to a single direction of rotation. A reciprocating spindle is attached to the frame and includes a contact pulley which engages with a portion of the perimeter belt. Movement of the spindle causes a displacement of the belt, which, in turn, moves about the frame, and drive and perimeter pulleys. Rotational restriction of the pulleys causes the perimeter belt to rotate in a single direction. Each cycle of reciprocation causes both drive pulleys to rotate in the same direction. The reciprocating spindle may be driven by human power or pressurized fluid, including internal combustion engines, and pneumatic and hydraulic cylinders.

DETAILED DESCRIPTION OF THE PREFERRED EMBODIMENT

Figure 1:
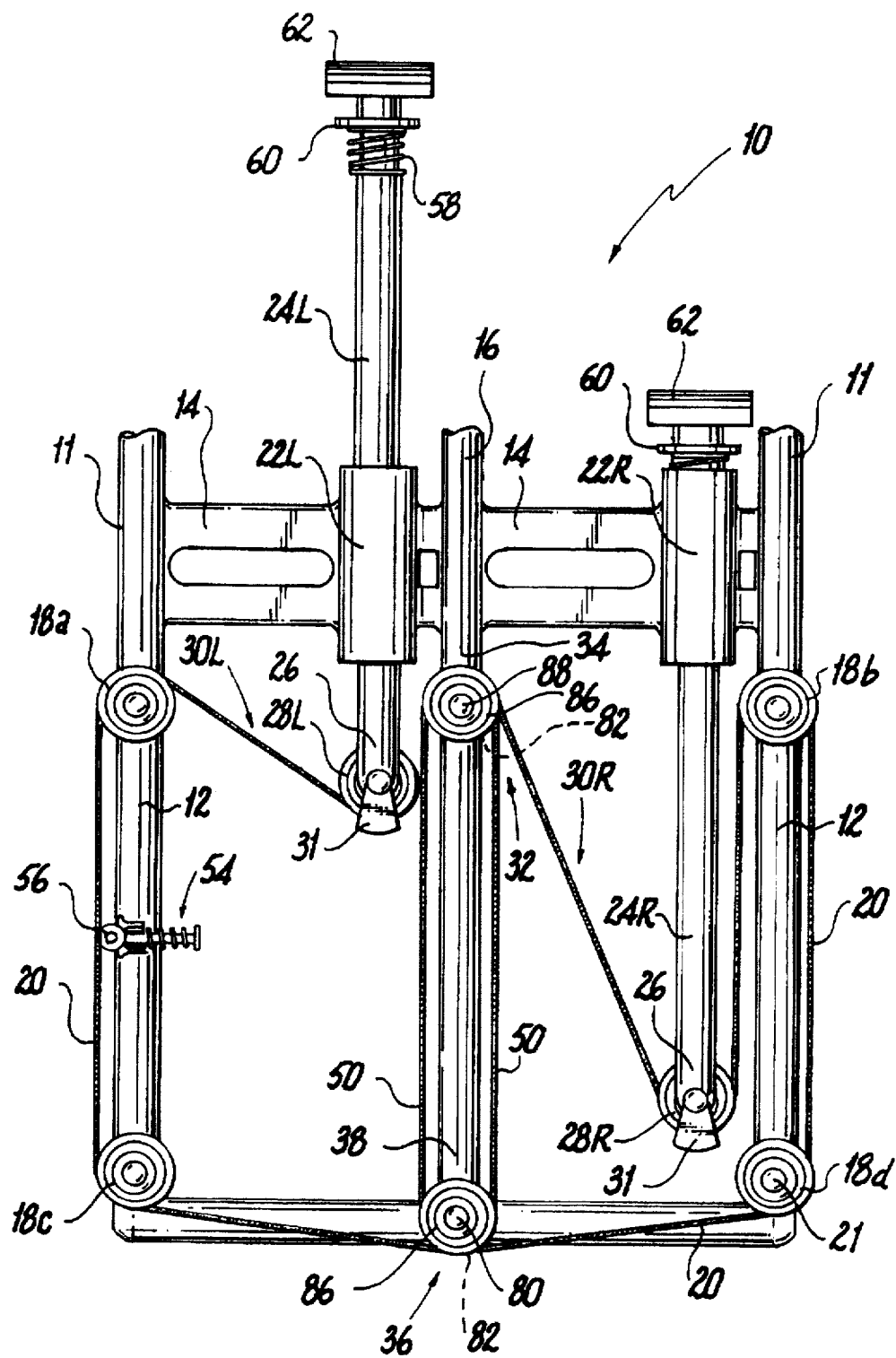
FIG. 1 is front elevation view of a motion translation device, according to a first embodiment of the invention.
Figure 2:
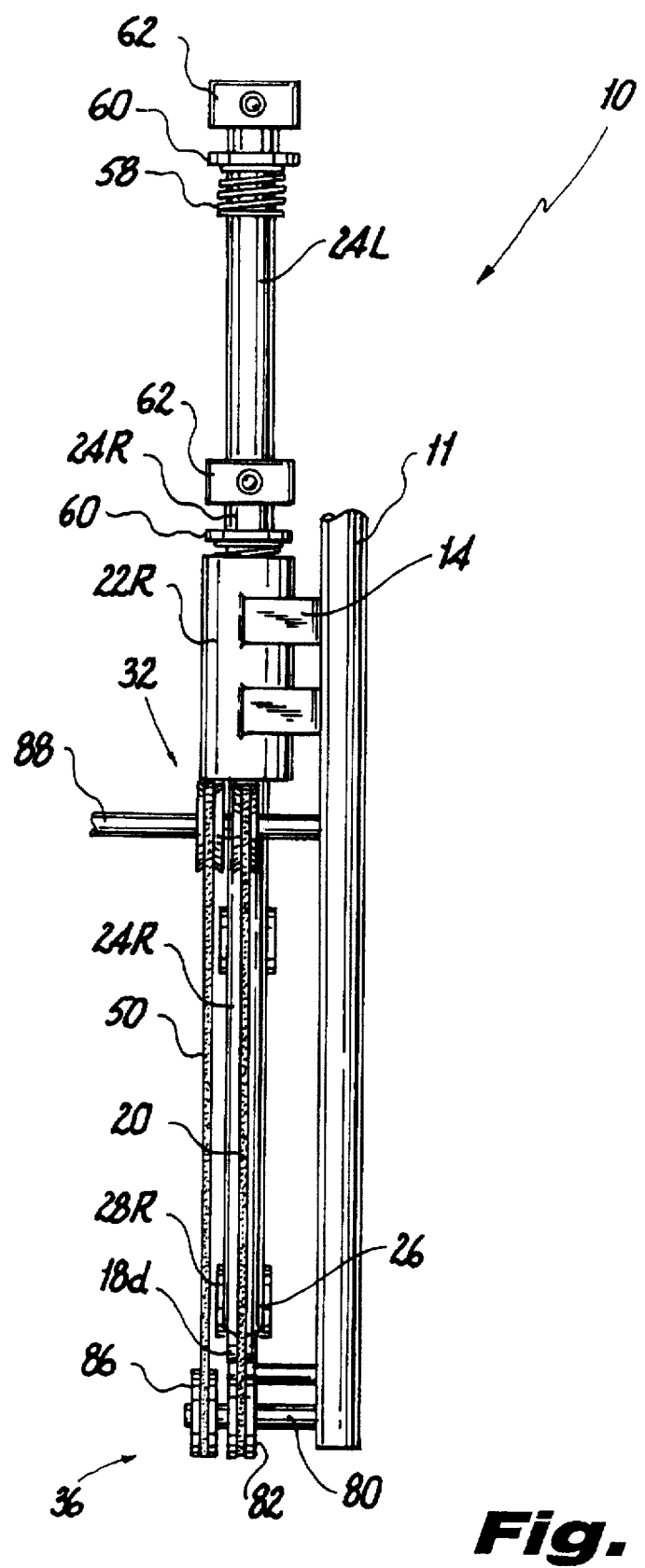
FIG. 2 is a side elevation view of the motion translation device, according to the first embodiment of the invention.

Referring to FIGS. 1 and 2, a motion translation device 10 is shown, according to a first embodiment of the invention, including a frame 11 having a generally U-shaped perimeter portion 12, horizontal connecting members 14, and a vertical central member 16. Connecting members 14 are connected to an upper end of U-shaped perimeter portion 12 in such a manner as to form a generally rectangular shape defining four corners. Central member 16 is attached to a central point of connecting members 14 and a lower part of perimeter portion 12.

Attached to perimeter portion 12 of frame 11 are perimeter pulleys 18a–d, one located at each corner of the rectangular frame. The term "pulley" is hereinafter used to describe any of several elements that function similarly, including sprockets and toothed wheels. Each pulley 18a–d described hereinafter is rotatably attached to frame 11 using an appropriate bolt or support pin 21.

An endless perimeter belt 20 engages with and is supported by perimeter pulleys 18a–d (the term "belt" is hereafter used to describe a belt of material such as rubber or leather, and includes a linked belt, such as chain). As is appreciated by those skilled in the art, the specific type of pulley and belt is chosen with regard to the application of the device and the system requirements (e.g., the amount of power being translated by the device).

Attached to horizontal connecting members 14 are two vertically disposed sleeves, a left sleeve 22L and a right sleeve 22R. Sleeves 22L and 22R slidably support two vertically disposed spindles, a left spindle 24L and a right spindle 24R, respectively. A left contact pulley 28L and a right contact pulley 28R are mounted to a lower end 26 of each spindle 24L, 24R, respectively. Left contact pulley 28L engages a left contact portion 30L of perimeter belt 20. Similarly, right contact pulley 28R engages a right contact portion 30R of perimeter belt 20, as shown for pulley 28R in FIG. 1. Each contact pulley 28L, 28R includes a belt cover 31 which is used to retain belt 20 on contact pulley 28L, 28R, during the operation of the machine.

Figure 5:
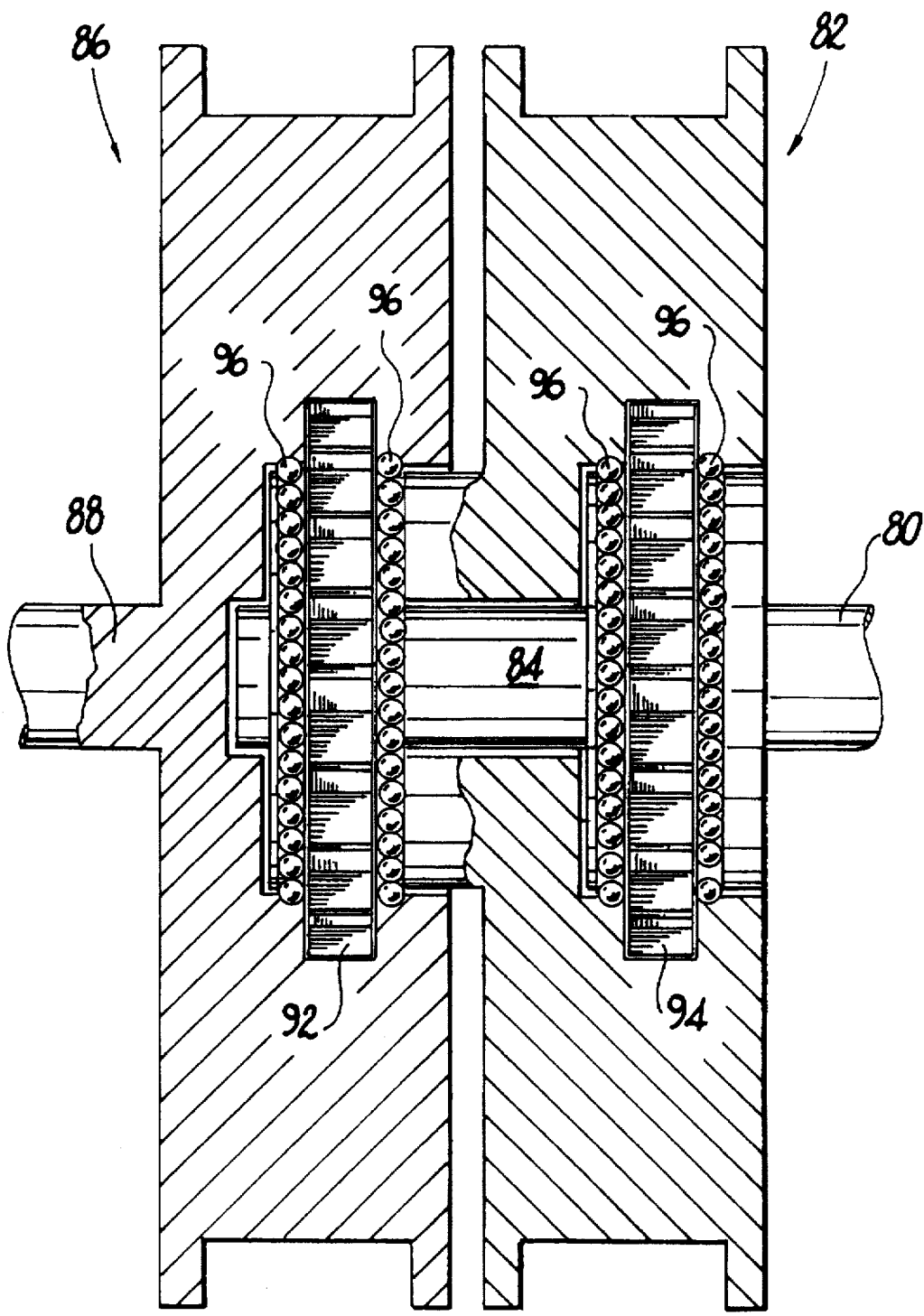
FIG. 5 is a partial sectional view of a drive-pulley pair, showing details of supporting bearings and one-way racheting mechanisms, according to the invention.
Figure 6:
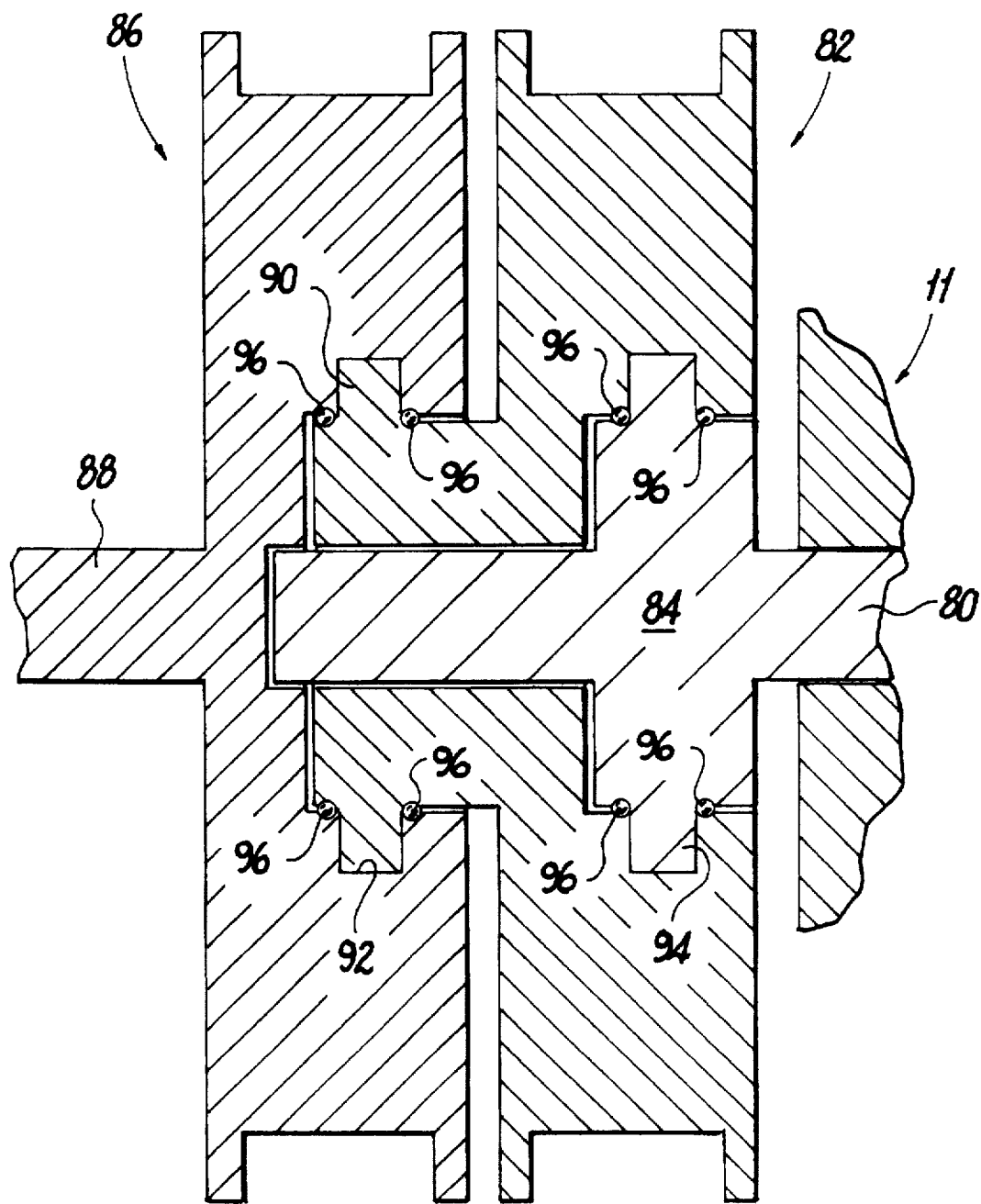
FIG. 6 is a sectional view of the drive-pulley pair shown in FIG. 5, according to the invention.

An upper drive pulley pair 32 is rotatably attached to an upper end 34 of central member 16, adjacent to cross members 14. A lower drive pulley pair 36 is similarly rotatably attached to a lower end 38 of central member 16. As shown in FIGS. 5 and 6, and described in greater detail below, upper and lower drive pulley pairs 32, 36 each include two independently rotatable drive pulleys (or sprockets), an inner drive pulley 82, and an outer drive pulley 86, both rotatably mounted to a support shaft 80. An endless drive belt (or chain) 50 is connected to each outer drive pulley 86 of each drive pulley pair 32, 36 so that both outer drive pulleys 32, 36 rotate together when drive belt 50 is linearly displaced.

At least one of the two outer drive pulleys 86 includes a rachet mechanism 92, as shown in FIGS. 5 and 6, which allows single-direction rotation of both outer drive pulleys 86, for example, counter clockwise.

Perimeter belt 20 engages each of the four perimeter pulleys 18a-d so that linear displacement of perimeter belt 20 (with both spindles 24R and 24L stationary) rotates all perimeter pulleys 18a-d simultaneously. Upper left perimeter pulley 18a and upper right perimeter pulley 18b preferably include one-way ratchets, similar to the one shown in FIG. 5. Lower and upper inner drive pulleys 82 preferably also include a one-way rotation rachet mechanism. Upper and lower inner drive pulleys 82 are positioned so that perimeter belt 20 engages these inner drive pulleys 82. Collectively, one-way racheting mechanisms 92 located within various pulleys described above allow both drive belt 50 and perimeter belt 20 to rotate in a single direction, for example, counter clockwise. The result of this arrangement, as described below, is that linear displacement of a spindle 24L or 24R causes linear displacement of perimeter belt 20 about perimeter pulleys 18a-d which, in turn, causes rotation of both drive pulley pairs 32, 36.

Lower right perimeter pulley 18d and a lower left perimeter pulley 18c are idler pulleys, i.e., they do not include one-way racket mechanisms and are free to rotate in either direction. These idler pulleys 18c, 18d are used to guide belt 20.

A tensioning device 54 is attached to a portion of frame 11 and includes a spring-loaded idler pulley 56 which is biased into perimeter belt 20. The degree of spring tension forcing idler pulley 56 into perimeter belt 20 is preferably adjustable.

A spring 58 and a flange 60 is preferably provided to each spindle, adjacent the upper end (and the pedal). Flange 60 is welded (or otherwise secured) to each respective spindle 24L, 24R. Each spring 58 is positioned about each respective spindle adjacent to and below each flange 60. As each spindle is fully depressed, each spring 58 will contact an upper portion of its respective sleeve 22L, 22R and prevent hard contact between a portion of the spindle (or pedal) and sleeve 22L, 22R.

According to this first embodiment, a pedal 62 is positioned at an upper end (opposite contact pulley 28L, 28R) of each spindle 24R, 24L so that a person may apply an reciprocating force to the pedals. The length of endless perimeter belt 20 is sufficient to accommodate the extended distance of either contact pulley 28R, 28L located in their respective lowest position, as shown for pulley 28R in FIG. 1. For example, as the operator (not shown) forces right spindle 24R downward, contact pulley 28R forces right contact portion 30R of perimeter belt 20 downward, towards perimeter frame 12. As perimeter belt 20 accommodates the inwardly directly displacement of the depressed contact pulley, perimeter belt 20 simultaneously forces left contact pulley 28L (and left spindle 24L) upward to its upper position.

In operation, according to this first embodiment, as shown in FIGS. 1-2, contact pulley 28R, 28L of each spindle is used to linearly displace perimeter belt 20 and thereby rotate both drive pulley pairs 32, 36. Each spindle 24R, 24L is slidable within their respective sleeves 22R, 22L a predetermined distance between an upper position and a lower position. As the cycle continues and contact pulleys 28R, 28L reciprocate, perimeter belt 20 is alternately forced downward at left contact portion 30L and right contact portion 30R of perimeter belt 20 (FIG. 1 shows right contact portion fully depressed by fully depressed right contact pulley 28R.

As contact portions 30R and 30L are alternately depressed by the reciprocating spindles 24R and 24L, respectively, perimeter belt 20 is forced to advance about perimeter pulleys 18a-d owing to the one-way rotation restriction of upper right perimeter pulley 18b, upper left perimeter pulley 18a, and inner drive pulleys 82. For example, in one instance, upper left perimeter pulley 18a, upper right perimeter pulley 18b and inner drive pulley 82 are restricted to counterclockwise rotation. In such instance, as left spindle 24L is depressed, left contact portion 30L is forced downward and the entire belt 20 advances around upper drive pulley 32 from right contact portion 30R (which is returning to a non-depressed condition with the right spindle rising). As left spindle 24L is further depressed, belt 20 from right contact portion 30R is transferred to left contact portion 30L (by passing around upper drive pulley 32), to accommodate the additional belt length required as left spindle continues down. In passing around drive pulley 32, belt 20 forces drive pulley 32 to rotate in a counterclockwise direction. In doing so, both upper and lower drive pulleys 32, 36 rotate counterclockwise. As left spindle 24L is depressed, only belt 20 from right contact portion 30R is transferred to left contact portion 30L and the remaining perimeter belt 20 located to the left of upper left pulley 18a or to the right of upper right pulley 18b remains stationary.

As the reciprocation cycle continues and right spindle 24R moves downward (and left spindle 24L rises), left contact portion 30L remains stationary owing to rachet mechanism 92 located within inner drive pulley 82 thereby forcing perimeter belt 20 to advance counterclockwise from left contact portion 30L about lower idler pulleys 18c, 18d and lower inner drive pulley 82, around upper right perimeter pulley 18b, to right contact portion 30R to accommodate the additional length of belt required by advancing right spindle 24R. As perimeter belt 20 passes lower inner drive pulley 82, both upper drive pulley 32 and lower drive pulley 36 rotate in a counterclockwise direction.

An output shaft 88 may connect with either upper or lower drive pulleys 32, 36 to transmit their rotational movement elsewhere, for example, to rotate a propeller or a drive wheel (not shown), depending on the particular application of the machine.

As spindles 24L and 24R are alternately depressed in a reciprocating fashion, one-way pulleys force perimeter belt 20 rotate both upper and lower drive pulleys 32, 36. Reciprocation of the spindles is therefore translated into rotational movement.

One stroke of spindle 24L, 24R will displace belt 20 a distance that is approximately equal to twice the length of the stroke length. If the stroke length is d, the belt is displaced by a distance 2d. In contrast, a prior art crank rotates ½ revolution of a crank to move a chain or belt a distance of ½ the perimeter of the crank. If the crank has a diameter d, this distance of movement of the belt is $\lambda d/2$ or 1.57d. Thus, the present invention is more efficient than a conventional crank by a ratio of 2d:1.57d or by approximately 27%.

Figure 3:
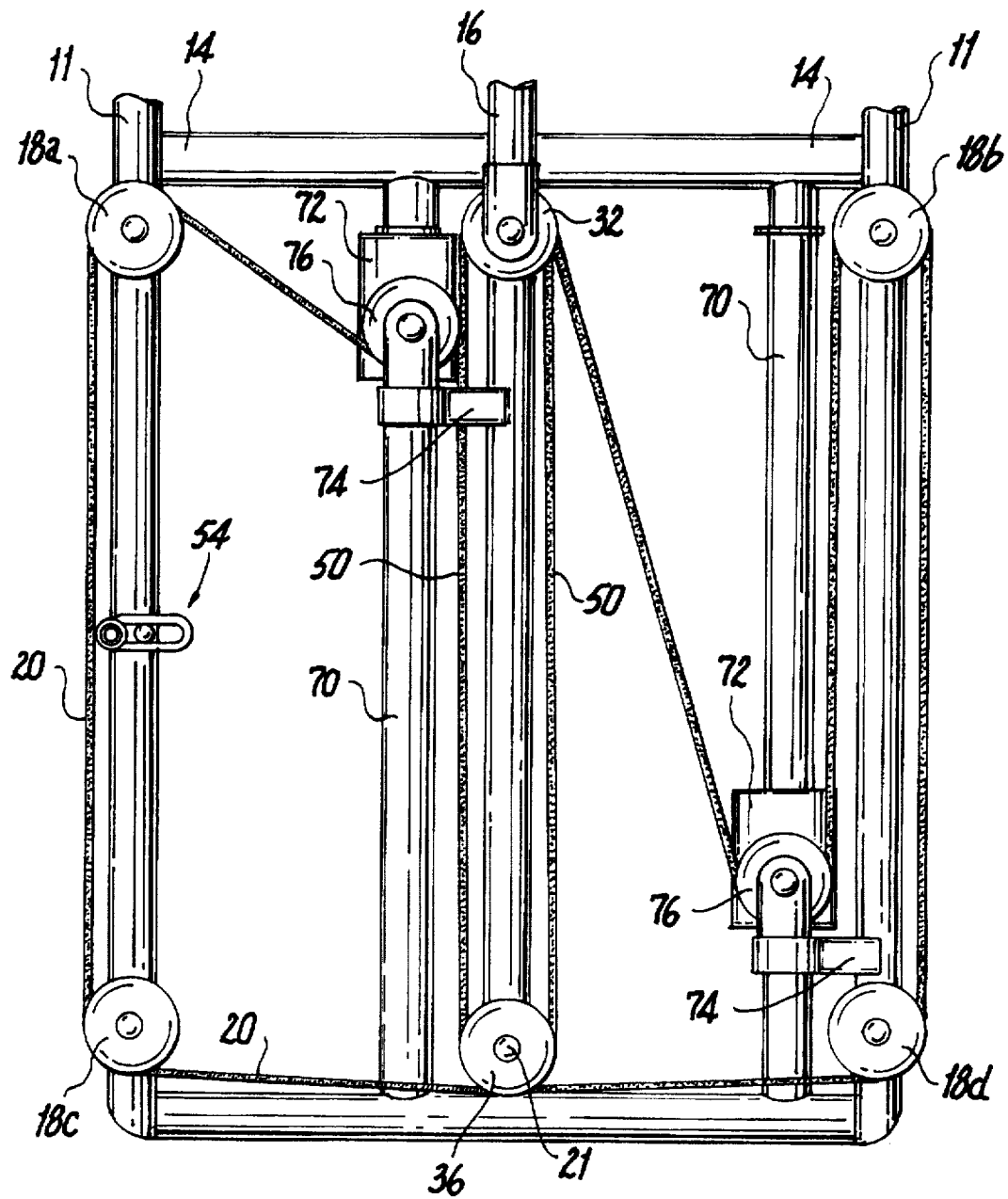
FIG. 3 is a front elevation view of a motion translation device, according to a second embodiment of the invention.
Figure 4:
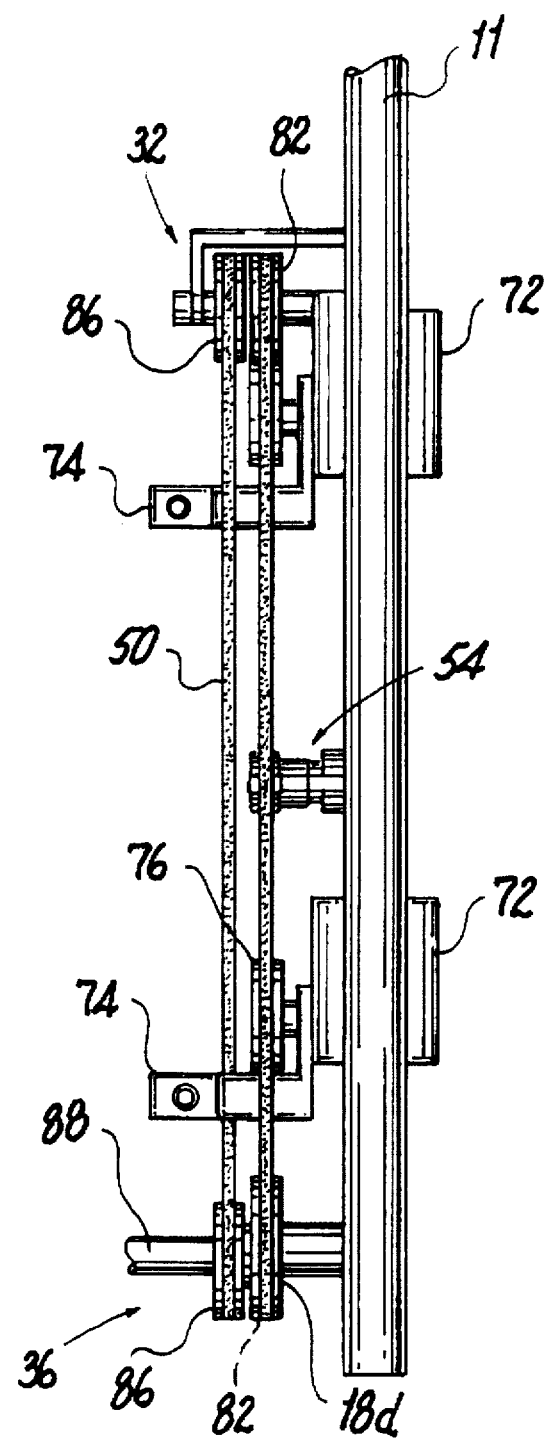
FIG. 4 is a side elevation view of the motion translation device, according to the second embodiment of the invention.

In accordance with a second embodiment of the invention, as shown in FIGS. 3-4, a translation machine is shown which is similar in construction and operation to that of the translation machine shown in FIGS. 1–2 and described above, however, spindles 24L and 24R are replaced by fixed spindles 70 along which sleeves 72 may travel. Fixed spindles 70 are attached to frame 11 parallel to central member 16 and perpendicular to upper cross member 14. Pedals 74 and contact pulleys 76 are pivotally attached to sleeves 72 so that a person may operate the machine through the application of a reciprocal movement to pedals 74, using his feet and legs. This embodiment is a compact version of the embodiment shown in FIGS. 1–2 and is suitable for applications restricting size, e.g., a bicycle, or a "pedal boat."

Referring to FIGS. 5–6, details of a drive pulley pair 32, 36 is shown, including a mounting shaft 80 attached to a frame 11, an inner pulley 82, an inner hub 84, an outer pulley 86 and an output shaft 88. Mounting shaft 80 and inner hub 84 are preferably formed integrally. Output shaft 88 is formed integral with (or is otherwise attached to) outer pulley 86. Outer pulley 86 is rotatably mounted to an outer hub 90 of inner pulley 82 and may rotate with respect to inner pulley 82. An outer rachet mechanism 92 is located between outer pulley 86 and outer hub 90 and is used to restrict relative rotation between outer pulley 86 and inner pulley 82 to a desired direction of rotation (i.e., counter clockwise or clockwise). Inner pulley 82 is rotatably attached to inner hub 84 and mounting shaft 80. An inner rachet mechanism 94 is provided between inner hub 84 and inner pulley 82 and is used to restrict rotational movement of inner pulley 82 with respect to frame 11 to a single angular direction. Appropriate bearings 96 are used between inner hub 84 and inner pulley 82, and between outer hub 90 and outer pulley 86. Bearings 96 are used to provide a low-friction surface for supporting inner and outer pulleys 82, 86 to mounting shaft 80.

Figure 7:
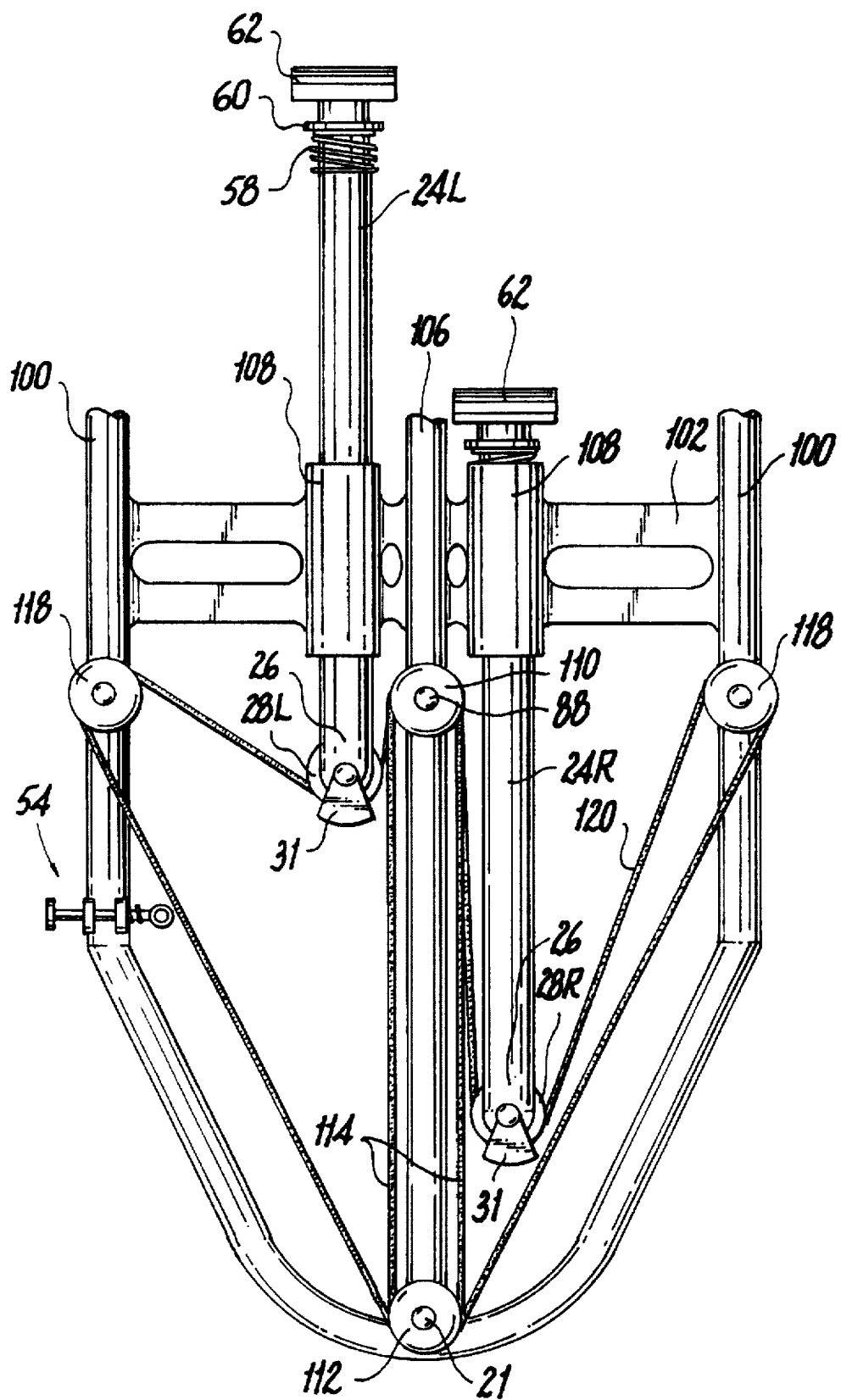
FIG. 7 is a front elevation view of the motion translation device, according to a third embodiment of the invention.

Referring to FIG. 7, a third embodiment of the invention is shown, which is similar in operation and construction to the above-described first embodiment, shown in FIGS. 1–2. The translation machine shown here includes a generally "V" shaped frame 100 connected to a cross member 102 at an upper end thereof. A central vertical support member 106 is connected to the "apex" of the "V" shaped frame 100 and a central point of cross member 102. Cross member 102 supports sleeves 108, which function identically to sleeves 22L, 22R of the embodiment of FIGS. 1–2. Sleeves 108 are positioned adjacent to each other and central support 106, as shown in FIG. 7. An upper drive pulley pair 110, a lower drive pulley pair 112 are interconnected by a drive belt 114 connected to outer pulleys, as in the previously described first embodiment. Upper perimeter pulleys 118 are attached to frame 100 and are used to support a perimeter belt 120 which also engages inner pulleys located within each drive pulley pair 110, 112. The translation machine according to this embodiment does not require two lower perimeter pulleys, as in the above described embodiments. By removing these lower perimeter pulleys, perimeter belt 120 may engage a greater circumference of lower drive pulley pair 112 and may therefore be less susceptible to slipping.

All of the other elements not specifically referred to with respect to FIG. 7 are equivalent in construction and function to the corresponding element shown in FIGS. 1–2 and described above.

Figure 8:
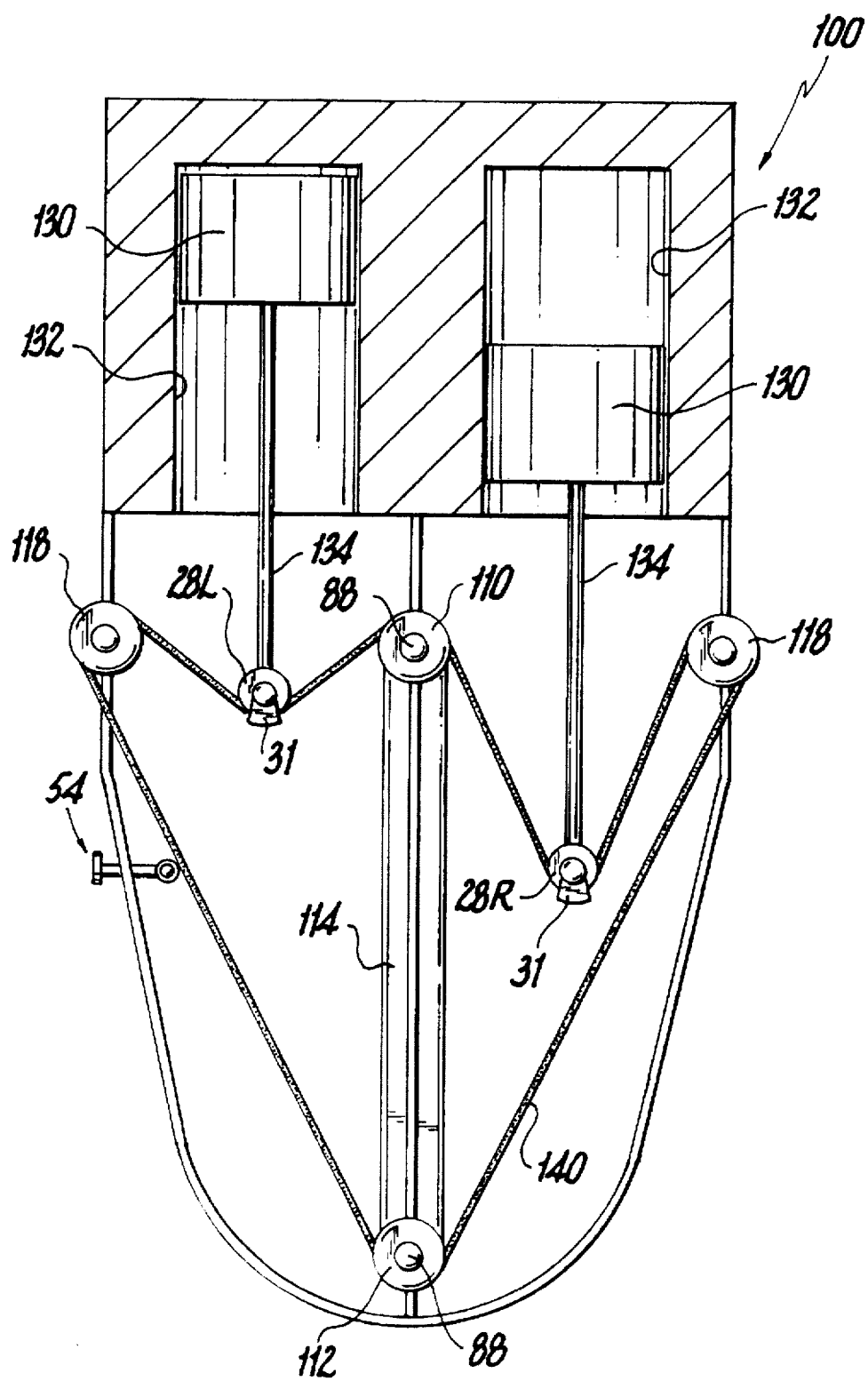
FIG. 8 is schematic view of the motion translation device, according to a fourth embodiment of the invention.

Referring to FIG. 8, another embodiment is shown which is a variation to the embodiment shown in FIG. 7 and described above. The translation machine shown in FIG. 8 includes pistons 130 slidably positioned in cylinders 132 and having connecting linkages 134 which are connected between each piston 130 and a contact pulley 28L, 28R. Pistons 130 are forced into a reciprocal movement through a source of pressure such as during the operation of an internal combustion engine (this pressure could also be produced by a steam engine, or a hydraulic or pneumatic actuator). The reciprocation of pistons 130 displaces a belt 140 in a manner identical to that described above with regard to the embodiment shown in FIGS. 1–2. Apart from the source of reciprocation (i.e., piston driven or pedal driven), the embodiments shown in FIG. 8 and FIG. 7 are identical. Furthermore, as described above, apart from the exclusion of lower perimeter pulleys 18c, 18d and the relocation of spindles 24L, 24R, the embodiment of FIG. 7 is identical to that of FIGS. 1–2 and for the sake of brevity will not be described further.

Having described the presently preferred exemplary embodiment of method and device mechanism for translating between reciprocating and rotational movement in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. A device for translating between reciprocal movement and rotation movement, said device comprising:

a frame;

a first drive pulley pair rotationally attached to said frame at a first point;

a second drive pulley pair rotationally attached to said frame at a second point which is remote from said first point;

means for restricting (92) one of said first and second drive pulley pairs to a single direction of rotation;

a drive belt (50) positioned around and engaged with said first and second drive pulley pairs;

at least two perimeter pulleys rotationally attached to said frame;

a perimeter belt (20) positioned around and engaged with said at least two perimeter pulleys and said first and second drive pulley pairs;

means for restricting said perimeter pulleys to a single direction of rotation; said restricted single direction of said one of said first and second drive pulley pairs being the same restricted single direction for both perimeter pulleys;

a spindle slidably attached to said frame and including a contact pulley at one end, said contact pulley engaging with a portion of said perimeter belt and movable between a raised position wherein said belt is not deflected, and a lowered position wherein said belt is deflected;

wherein said deflected belt is displaced in a single direction about said frame and around said perimeter pulleys and said drive pulley pairs by said restriction means, said single direction displacement of said belt causing rotation of said drive pulley pairs; and means for extracting rotation of any of said pulleys to perform useful work.

* * * * *